(12) United States Patent
Lee et al.

(10) Patent No.: US 9,952,806 B2
(45) Date of Patent: Apr. 24, 2018

(54) MAPPING TABLE LOADING METHOD AND MEMORY STORAGE APPARATUS

(71) Applicant: Hefei Core Storage Electronic Limited, Anhui Province (CN)

(72) Inventors: Hao-Zhi Lee, Miaoli County (TW); Qi-Ao Zhu, Anhui Province (CN); Chong Peng, Anhui Province (CN); Hui Xie, Anhui Province (CN)

(73) Assignee: Hefei Core Storage Electronic Limited, Anhui Province (CN)

( * ) Notice: Subject to any disclaimer, the term of this patent is extended or adjusted under 35 U.S.C. 154(b) by 1 day.

(21) Appl. No.: 15/352,589

(22) Filed: Nov. 16, 2016

(65) Prior Publication Data

US 2018/0088863 A1 Mar. 29, 2018

(30) Foreign Application Priority Data

Sep. 29, 2016 (CN) .......................... 2016 1 0864949

(51) Int. Cl.
*G06F 3/06* (2006.01)

(52) U.S. Cl.
CPC .......... *G06F 3/0659* (2013.01); *G06F 3/0608* (2013.01); *G06F 3/0652* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,858,008 B2 * | 1/2018 | Liu | .......................... G06F 3/064 |
| 2011/0044198 A1 * | 2/2011 | Persson | ................. H04W 28/24 370/252 |
| 2015/0019794 A1 * | 1/2015 | Byun | .................. G06F 12/0246 711/103 |

* cited by examiner

*Primary Examiner* — Kevin Verbrugge
(74) *Attorney, Agent, or Firm* — JCIPRNET

(57) ABSTRACT

A mapping table loading method and a memory storage apparatus are provided. The method includes: receiving a plurality of first read commands comprising a plurality of first logical units; executing a first logical-physical mapping table pre-loading operation to read a plurality of mapping information corresponding to the first logical units in a logical-physical mapping table from a rewritable non-volatile memory module to a first buffer area of a buffer memory according to a first executing sequence of the first read commands if the first logical units are not continuous logical addresses; and reading data belonging to the first logical units from physical erasing units to the first buffer area according to the mapping information of the first logical units, and replacing the mapping information of the first logical units in the first buffer area by the data belonging to the first logical units.

22 Claims, 12 Drawing Sheets

MAPPING TABLE LOADING METHOD AND MEMORY STORAGE APPARATUS

CROSS-REFERENCE TO RELATED APPLICATION

This application claims the priority benefit of China application serial no. 201610864949.5, filed on Sep. 29, 2016. The entirety of the above-mentioned patent application is hereby incorporated by reference herein and made a part of this specification.

BACKGROUND

Technical Field

The present invention relates to a mapping table loading method, and more particularly, to a mapping table loading method for a rewritable non-volatile memory module, a memory control circuit unit and a memory storage apparatus.

Description of Related Art

The growth of digital cameras, mobile phones, and MP3 players has been rapid in recent years. Consequently, the consumers' demand for storage media has increased tremendously. A rewritable non-volatile memory is one of the most adaptable memories for portable electronic products such as laptop computer due to its data non-volatility, low power consumption, small volume, non-mechanical structure and high read/write speed. A solid state drive (SSD) is a memory storage apparatus which utilizes a flash memory module as a storage medium. For these reasons, the flash memory has become an import part of the electronic industries.

The memory storage apparatus using the rewritable non-volatile memory module as a storage medium is generally recorded with a mapping relation between logical addresses and physical erasing units so a host system can successfully access data in the rewritable non-volatile memory module. Specifically, a memory management circuit in the memory storage apparatus stores one or more logical-physical mapping tables for recording mapping information between the logical addresses and the physical erasing units (or between the logical addresses and physical programming units) in the rewritable non-volatile memory module. When intending to access the data, the memory management circuit loads the corresponding logical-physical mapping table to a buffer memory and then writes or reads the data according to the logical-physical mapping table.

Generally, the buffer memory is configured with a buffer area configured to temporarily store the logical-physical mapping table and a buffer area configured to temporarily store data and commands from the host system or data from the rewritable non-volatile memory module. Particularly, when the host system executes a random read operation, the memory management circuit needs to correspondingly load multiple parts of the mapping information in the logical-physical mapping table to the buffer memory. However, because a capacity of the buffer memory is limited. Therefore, the parts of mapping information cannot be temporarily stored all at the same time since the capacity of the buffer area configured to temporarily store those parts of the mapping information is limited. As such, the memory management circuit must first complete reading the data corresponding to the mapping information currently in the buffer area from the rewritable non-volatile memory module to the buffer area and transmitting said data from the buffer area to the memory management circuit. Only then, the memory management circuit can proceed to give the next random read command in a command queue to the rewritable non-volatile memory module and load the other parts of the mapping information to the buffer area. This situation will lead to a low efficiency in spending the time for executing the read commands, resulting in a performance deterioration of the memory storage apparatus.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a mapping table loading method, a memory control circuit unit and a memory storage apparatus, which are capable of effectively reducing the time for executing read commands, so as to improve speed and performance of the memory storage apparatus when reading data.

An exemplary embodiment of the invention provides a mapping table loading method for a rewritable non-volatile memory module. The rewritable non-volatile memory module has a plurality of physical erasing units. Each of the physical erasing units has a plurality of physical programming units, and a logical-physical mapping table is stored in the rewritable non-volatile memory module. The mapping table loading method includes: assigning a plurality of logical units, where each of the logical units corresponds to at least one physical programming unit; receiving a plurality of first read commands by a memory control circuit unit having a buffer memory, where the first read commands include a plurality of first logical units; executing a first logical-physical mapping table pre-loading operation if the first logical units are not continuous logical addresses, where the first logical-physical mapping table pre-loading operation includes reading mapping information corresponding to the first logical units in the logical-physical mapping table from the rewritable non-volatile memory module to a first buffer area of the buffer memory according to a first executing sequence of the first read commands; and sending a first read command sequence corresponding to the first read commands, reading data belonging to the first logical units from the physical erasing units to the first buffer area according to the mapping information of the first logical units, and replacing the mapping information of the first logical units in the first buffer area by the data belonging to the first logical units.

An exemplary embodiment of the invention provides a mapping table loading method for a rewritable non-volatile memory module. The rewritable non-volatile memory module has a plurality of physical erasing units. Each of the physical erasing units has a plurality of physical programming units, and a logical-physical mapping table is stored in the rewritable non-volatile memory module. The mapping table loading method includes: assigning a plurality of logical units, where each of the logical units corresponds to at least one physical programming unit; receiving a plurality of first read commands by a memory control circuit unit having a buffer memory, where the first read commands include a plurality of first logical units; according to a first executing sequence of the first read commands in a command queue, reading one of the first read commands from the command queue and reading first mapping information corresponding to the one of the first read commands from the logical-physical mapping table to a second buffer area of the buffer memory; reading another one of the first read commands from the command queue according to the first executing sequence of the first read commands; determining whether the first logical units are the continuous logical addresses according to the logical unit in the one of the first read commands and the logical unit in the another one of the first read commands; and executing a first logical-physical mapping table pre-loading operation when determining that the first logical units are not continuous logical addresses, where the first logical-physical mapping table pre-loading operation includes reading mapping information corresponding to the first logical units in the logical-physical mapping table from the rewritable non-volatile memory module to a first buffer area of the buffer memory according to the first executing sequence of the first read commands, where the second buffer area is different from the first buffer area.

An exemplary embodiment of the invention provides a memory storage apparatus, which includes a connection interface unit, a rewritable non-volatile memory module and aforesaid memory control circuit unit. The connection interface unit is coupled to a host system, and the memory control circuit unit is coupled to the connection interface unit and the rewritable non-volatile memory module and includes a buffer memory. The memory control circuit unit is configured to assign a plurality of logical units, where each of the logical units corresponds to at least one physical programming unit. The memory control circuit unit is further configured to receive a plurality of first read commands from the host system. The first read commands include a plurality of first logical units. The memory control circuit unit is further configured to execute a second logical-physical mapping table pre-loading operation if the first logical units are the continuous logical addresses. The first logical-physical mapping table pre-loading operation includes: reading mapping information corresponding to the first logical units in the logical-physical mapping table from the rewritable non-volatile memory module to a first buffer area of the buffer memory according to a first executing sequence of the first read commands. The memory control circuit unit is further configured to send a first read command sequence corresponding to the first read commands, read data belonging to the first logical units from the physical erasing units to the first buffer area according to the mapping information of the first logical units, and replace the mapping information of the first logical units in the first buffer area by the data belonging to the first logical units.

An exemplary embodiment of the invention provides a memory storage apparatus, which includes a connection interface unit, a rewritable non-volatile memory module and aforesaid memory control circuit unit. The connection interface unit is coupled to a host system, and the memory control circuit unit is coupled to the connection interface unit and the rewritable non-volatile memory module and includes a buffer memory. The memory control circuit unit is configured to assign a plurality of logical units, where each of the logical units corresponds to at least one physical programming unit. The memory control circuit unit is further configured to receive a plurality of first read commands from the host system. The first read commands include a plurality of first logical units. The memory control circuit unit is further configured to, according to a first executing sequence of the first read commands in a command queue, read one of the first read commands from the command queue and read first mapping information corresponding to the one of the first read commands from the logical-physical mapping table to a second buffer area of the buffer memory. The memory control circuit unit is further configured to read another one of the first read commands from the command queue according to the first executing sequence of the first read commands in the command queue. The memory control circuit unit is further configured to determine whether the first logical units are the continuous logical addresses according to the logical unit in the one of the first read commands and the logical unit in the another one of the first read commands. The memory control circuit unit is further configured to execute a second logical-physical mapping table pre-loading operation when determining that the first logical units are the continuous logical addresses. The first logical-physical mapping table pre-loading operation includes: reading mapping information corresponding to the first logical units in the logical-physical mapping table from the rewritable non-volatile memory module to a first buffer area of the buffer memory according to the first executing sequence of the first read commands.

Based on the above, according to the exemplary embodiments of the invention, multiple non-continuous mapping information generated from the random read operation executed by the host system may be sequentially pre-loaded to the first buffer area with greater space (i.e., the buffer area configured to temporarily store data and commands from the host system or data from the rewritable non-volatile memory module) while the rewritable non-volatile memory module is in the busy state. In this way, the waiting time originally required in the busy state may be fully utilized to effectively reduce the time for executing the read commands. On the other hand, according to the exemplary embodiments of the invention, data read from the rewritable non-volatile memory module are used to replace the mapping information pertaining to those data in the first buffer area. Accordingly, when the rewritable non-volatile memory module is in the busy state and the host system is executing the random read operation, the read mapping information is no longer limited by the capacity of the second buffer area configured to temporarily store the logical-physical mapping table and the configured space of the buffer memory may be effectively saved according to the exemplary embodiments of the invention. As a result, speed and performance of the memory storage apparatus when reading data may also be improved.

To make the above features and advantages of the invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
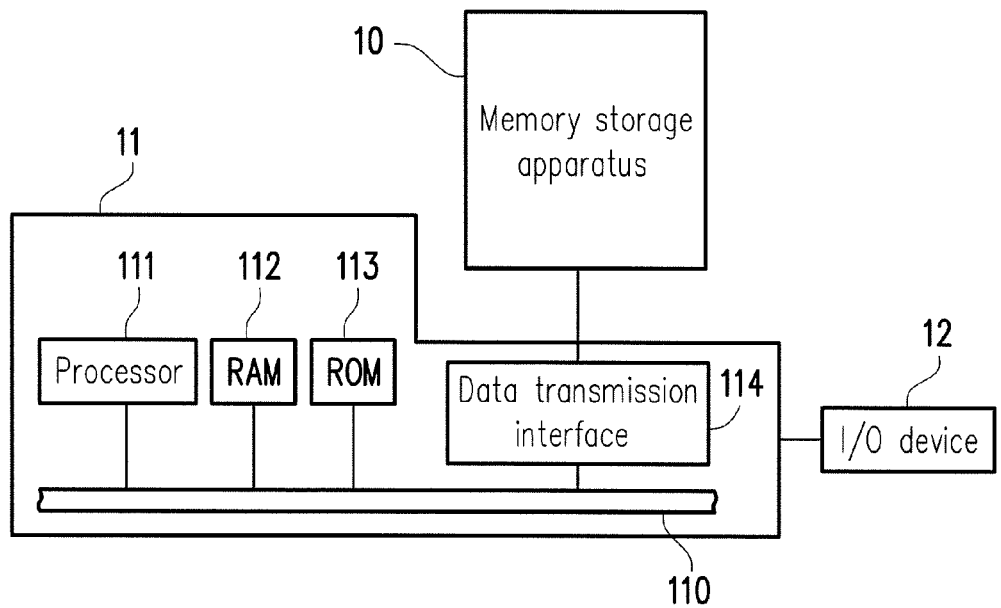
FIG. 1 is a schematic diagram illustrating a host system, a memory storage apparatus and an I/O (input/output) device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage apparatus (also known as a memory storage system) includes a rewritable non-volatile memory module and a controller (also known as a control circuit). The memory storage apparatus is usually configured to cooperate with a host system so the host system may write data into or read data from the memory storage apparatus.

Figure 2:
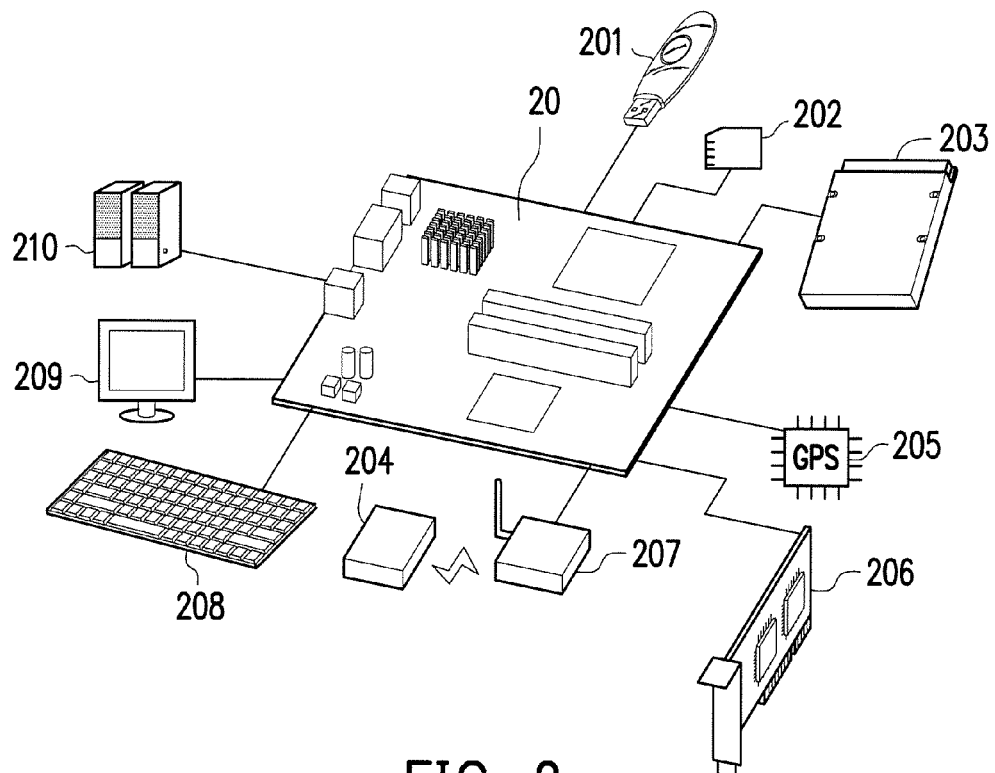
FIG. 2 is a schematic diagram illustrating a host system, a memory storage apparatus and an I/O device according to another exemplary embodiment of the invention.

FIG. 1 is a schematic diagram illustrating a host system, a memory storage apparatus and an I/O (input/output) device according to an exemplary embodiment of the invention. FIG. 2 is a schematic diagram illustrating a host system, a memory storage apparatus and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage apparatus 10 via the data transmission interface 114. For example, the host system 11 can write data into the memory storage apparatus 10 or read data from the memory storage apparatus 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage apparatus 10 in a wired manner or a wireless manner. The memory storage apparatus 10 may be, for example, a flash drive 201, a memory card 202, a SSD (Solid State Drive) 203 or a wireless memory storage apparatus 204. The wireless memory storage apparatus 204 may be, for example, a memory storage apparatus based on various wireless communication technologies, such as a NFC (Near Field Communication) memory storage apparatus, a WiFi (Wireless Fidelity) memory storage apparatus, a Bluetooth memory storage apparatus, a BLE (Bluetooth low energy) memory storage apparatus (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 via the system bus 110. For example, in an exemplary embodiment, the main board 20 can access the wireless memory storage apparatus 204 via the wireless transmission device 207.

Figure 3:
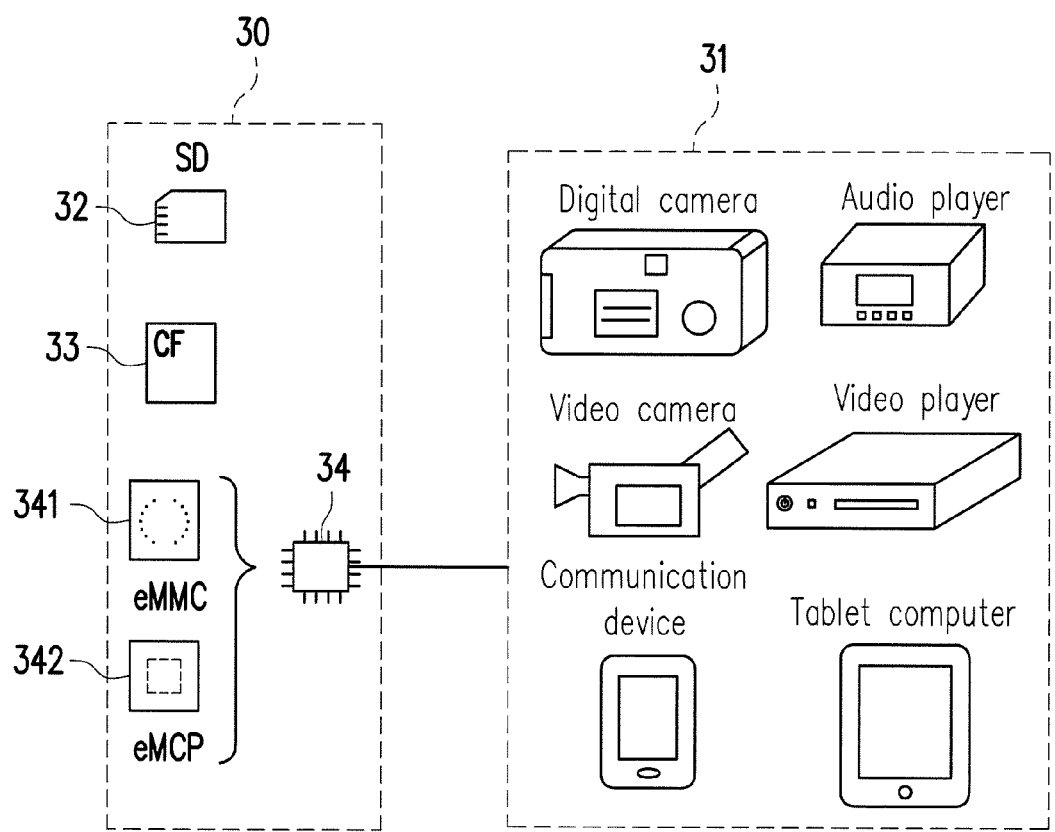
FIG. 3 is a schematic diagram illustrating a host system and a memory storage apparatus according to another exemplary embodiment of the invention.

In an exemplary embodiment, aforementioned host system may be any system capable of substantially cooperating with the memory storage apparatus for storing data. Although the host system is illustrated as a computer system in foregoing exemplary embodiment, nonetheless, FIG. 3 is a schematic diagram illustrating a host system and a memory storage apparatus according to another exemplary embodiment of the invention. Referring to FIG. 3, in another exemplary embodiment, a host system 31 may also be a system including a digital camera, a video camera, a communication device, an audio player, a video player or a tablet computer, whereas a memory storage apparatus 30 can be various non-volatile memory devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
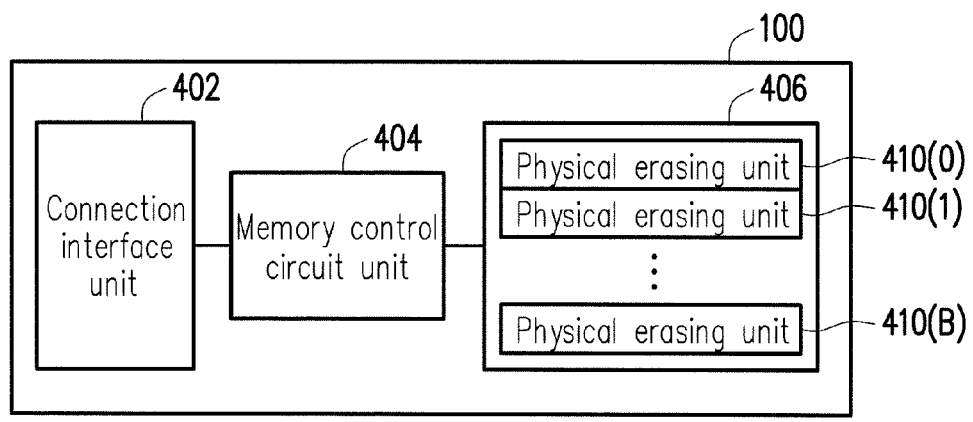
FIG. 4 is a schematic block diagram illustrating a memory storage apparatus according to an exemplary embodiment of the invention.

FIG. 4 is a schematic block diagram illustrating a memory storage apparatus according to an exemplary embodiment of the invention.

Referring to FIG. 4, the memory storage apparatus 10 includes a connection interface unit 402, a memory control circuit unit 404 and a rewritable non-volatile memory module 406.

In the present exemplary embodiment, the connection interface unit 402 is compatible with a SATA (Serial Advanced Technology Attachment) standard.

Nevertheless, it should be understood that the invention is not limited thereto. The connection interface unit 402 may also be compatible to a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD (Secure Digital) interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

The rewritable non-volatile memory module 406 is coupled to the memory control circuit unit 404 and configured to store data written from the host system 11. The rewritable non-volatile memory storage module 406 includes multiple physical erasing units 410(0) to 410(B). For example, the physical erasing units 410(0) to 410(B) may belong to the same memory die or belong to different memory dies. Each physical erasing unit has a plurality of physical programming units, and the physical programming units of the same physical erasing unit may be written separately and erased simultaneously. Nevertheless, it should be understood that the invention is not limited thereto. Each physical erasing unit may be constituted by 64 physical programming units, 256 physical programming units or any number of the physical programming units.

Figure 5:
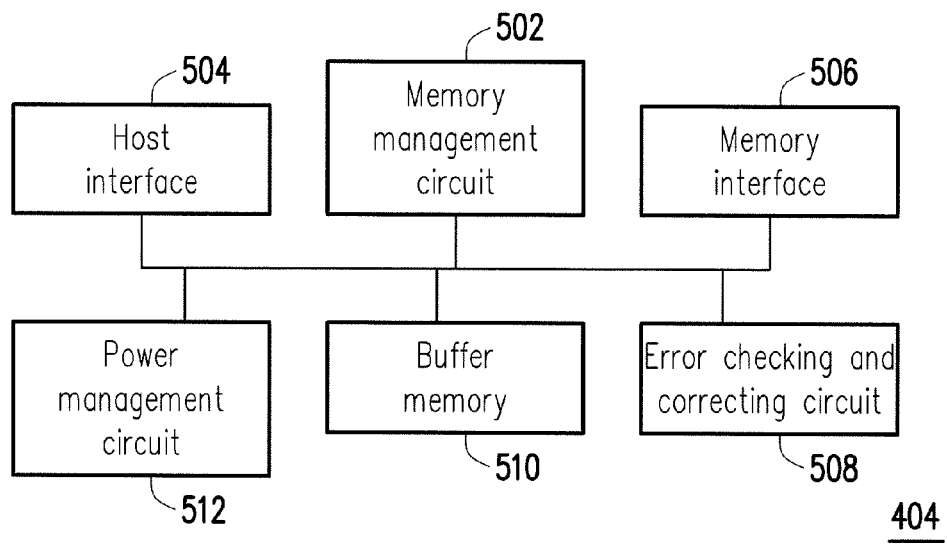
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands and the control commands are executed to perform various operations such as writing, reading and erasing data during operation of the memory storage apparatus 10. Hereinafter, operations of the memory management circuit 502 are described as equivalent to describing operations of the memory control circuit unit 404.

In the present exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage apparatus 10 operates, the control commands are executed by the microprocessor to perform operations of writing, reading or erasing data.

In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), the read only memory (not illustrated) and a random access memory (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations, such as writing, reading or erasing data.

Further, in another exemplary embodiment, the control commands of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to give a write command sequence for the rewritable non-volatile memory module 406 in order to write data into the rewritable non-volatile memory module 406. The memory reading circuit is configured to give a read command sequence for the rewritable non-volatile memory module 406 in order to read data from the rewritable non-volatile memory module 406. The memory erasing circuit is configured to give an erase command sequence for the rewritable non-volatile memory module 406 in order to erase data from the rewritable non-volatile memory module 406. The data processing circuit is configured to process both the data to be written into the rewritable non-volatile memory module 406 and the data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502 and configured to receive and identify commands and data sent from the host system 11. In other words, the commands and data transmitted by the host system 11 are transmitted to the memory management circuit 502 via the host interface 504. In the present exemplary embodiment, the host interface 504 is compatible with the SATA standard. However, it should be understood that the invention is not limited thereto, and the host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence which instructs to write data, the read command sequence which instructs to read data, the erase command sequence which instructs to erase data, and other corresponding command sequences for instructing to perform various memory operations (e.g., changing read voltage levels or performing a garbage collection procedure). These command sequences are generated by the memory management circuit 502 and transmitted to the rewritable non-volatile memory module 406 via the memory interface 506, for example. The command sequences may include one or more signals, or data transmitted in the bus. The signals or the data may include command codes and program codes. For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure integrity of data. Specifically, when the memory management circuit 502 receives the write command from the host system 11, the error checking and correcting circuit 508 generates an ECC (error correcting code) and/or an EDC (error detecting code) for data corresponding to the write command, and the memory management circuit 502 writes data corresponding to the write command and the corresponding ECC and/or the EDC into the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage apparatus 10.

It is noted that in the following description, some terms may be replaced with corresponding abbreviations for ease of reading (see Table 1).

TABLE 1

| | |
|---|---|
| logical-to-physical mapping table | L2P table |
| physical-to-logical mapping table | P2L table |
| rewritable non-volatile memory module | RNVM module |
| physical unit | PU |
| physical erasing unit | PEU |
| physical programming unit | PPU |
| logical unit | LU |
| logical erasing unit | LEU |
| logical programming unit | LPU |
| memory management circuit | MMC |
| memory control circuit unit | MCCU |
| error checking and correcting circuit | ECCC |

Figure 6:
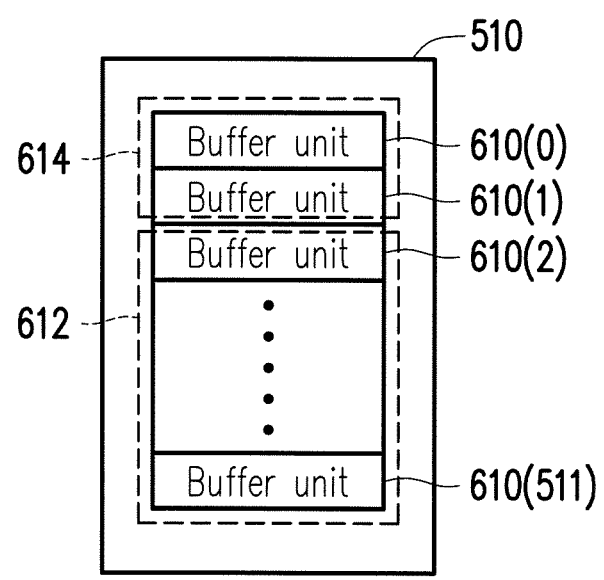
FIG. 6 is a schematic diagram illustrating a buffer memory according to an exemplary embodiment.

FIG. 6 is a schematic diagram illustrating a buffer memory according to an exemplary embodiment.

With reference to FIG. 6, the buffer memory 510 has 512 buffer units (i.e., buffer units 610(0) to 610(511)), and a capacity of each buffer unit is 4 KB (also known as a first unit capacity). Specifically, a capacity of four buffer units corresponds to a capacity of one PPU in the rewritable non-volatile memory. However, it should be understood that, the present exemplary embodiment is not intended to limit the number of the buffer units configured for the buffer memory 510, the capacity of the buffer unit and a size of data transmitted by the host system 11. For example, in other exemplary embodiments, the number of the buffer units in the buffer memory 510 may be more or less than 512 buffer units. Further, the host system 11 transmits or accesses data in 4 KB units, for example. Alternatively, in another exemplary embodiment, a data capacity transmitted or accessed each time by the host system 11 may also be greater than or less than 4 KB.

In the present exemplary embodiment, the memory cells of the RNVM module 406 constitute a plurality of PPUs, and the PPUs constitute a plurality of PEUs. For example, the memory cells on the same word line constitute one or more PPUs. If each of the memory cells can store more than one bit, the PPUs on the same word line can be at least classified into a lower PPU and an upper PPU. For instance, a least significant bit (LSB) of one memory cell belongs to the lower PPU, and a most significant bit (MSB) of one memory cell belongs to the upper PPU. Generally, in the MLC NAND flash memory, a writing speed of the lower PPU is higher than a writing speed of the upper PPU, and/or a reliability of the lower PPU is higher than a reliability of the upper PPU.

In the present exemplary embodiment, the PPU is the minimum unit for programming. That is, the PPU is the minimum unit for writing data. For example, the PPU is a physical page or a physical sector. When the PPUs are the physical page, these PPUs usually include a data bit area and a redundancy bit area. The data bit area includes multiple physical sectors configured to store user data, and the redundant bit area is configured to store system data (e.g., an error correcting code).

In the present exemplary embodiment, the data bit area includes 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the PEU is the minimum unit for erasing. Namely, each PEU contains the least number of memory cells to be erased together. For instance, the PEU is a physical block.

Figure 7:
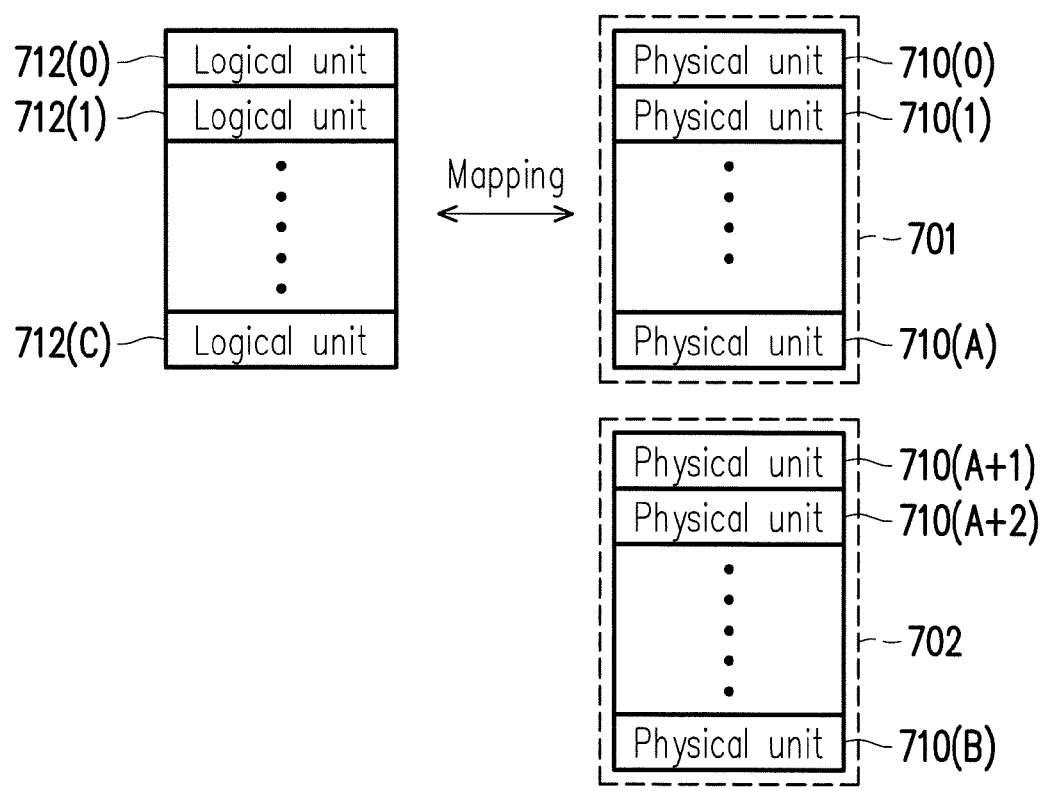
FIG. 7 is a schematic diagram illustrating management of a rewritable non-volatile memory module according to an exemplary embodiment of the invention.

FIG. 7 is a schematic diagram illustrating management of a rewritable non-volatile memory module according to an exemplary embodiment of the invention. It should be understood that terms, such as "select" and "group", are logical concepts which describe operations in the PUs of the RNVM module 406. That is to say, the PUs of the RNVM module 406 are logically operated while actual locations of the PUs of the RNVM module 406 remain unchanged.

Referring to FIG. 7, the MMC 502 logically groups the memory cells of the RNVM module 406 into PUs 710(0) to 710(B). In this exemplary embodiment, each PU in the PUs 710(0) to 710(B) refers to one or more PPUs. However, in another exemplary embodiment, each PU in the PUs 710(0) to 710(B) refers to one or more PEUs. For example, each PU in the PUs 710(0) to 710(B) is the PEUs 410(0) to 410(B).

In the present exemplary embodiment, the MMC 502 logically groups the PUs 710(0) to 710(B) into a storage area 701 and a spare area 702. The PUs 710(0) to 710(A) in the storage area 701 are stored with data, and the PUs 710(A+1) to 710(B) in the spare area 702 are not yet used for storing data. For example, each PU belonging to the storage area 701 may be stored with valid data and/or invalid data, and one PU belonging to the storage area 701 being erased is associated to the spare area 702. After one PU belonging to the storage area 701 is fully written, one specific PU is then selected from the spare area 702 and associated to the storage area 701 for storing other data.

In the present exemplary embodiment, the MMC 502 assigns LUs 712(0) to 712(C) for mapping to the PUs 710(0) to 710(A) in the storage area 701. In the present exemplary embodiment, the host system 11 accesses the data stored in the storage area 701 through a logical address (LA). Therefore, each of the LUs 712(0) to 712(C) refers to one logical address. Also, in the present exemplary embodiment, each LU among the LUs 712(0) to 712(C) is mapped to at least one of the PPUs. However, in another exemplary embodiment, each one of the LUs 712(0) to 712(C) may also refer to one LPU, one LEU or a composition of a plurality of continuous or non-continuous logical addresses.

Generally, the MMC 502 records a mapping relation (also known as a logical-physical mapping relation) between the LUs and the PUs into at least one logical-physical mapping table (L-P table). When the host system 11 intends to read the data from the memory storage apparatus 10 or write the data into the memory storage apparatus 10, the MMC 502 may access the data in the memory storage apparatus 10 according to the L2P table. For instance, the MMC 502 stores one or more L-P tables for recording mapping information between the logical addresses and the PEUs (or between the logical addresses and PPUs) in the RNVM module 406. When the host system 11 gives a plurality of read commands (also known as first read commands) to the MMC 502 and the first read commands are, for example, used to instruct reading one or more logical addresses among the logical addresses 720(0) to 712(C), the MMC 502 places the first read commands in a command queue, and then MMC 502 decides an executing sequence for executing the first read commands. If the MMC 502 intends to execute one specific first read command, the MMC 502 can obtain the logical address to be read by the specific first read commands, obtain one PEU or PPU mapped by the logical address and read data from said PEU or PPU so the data can be transmitted to the host system 11.

It should be noted that, after a read command sequence (also known as a first read command sequence) corresponding to at least one of the first read commands in the command queue is given by the MMC 502, the MMC 502 reads data corresponding to the mapping information currently in the buffer area from the RNVM module 406 to a buffer area configured to temporarily store data and commands from the host system 11 or data from the RNVM module 406 (also known as a data upload operation), and receives said data from the buffer area (also known as an internal data transmission). Meanwhile, the RNVM module 406 is in a busy state, and the MMC 502 can no longer give any command sequence to the RNVM module in the busy state.

In addition, because the MMC 502 can load the L-P table corresponding to the read commands to the buffer memory 510 before the first read command sequence corresponding to the first read commands is given by the MMC 502, the data may be written or read according to the L-P table in the buffer memory 510 right after the first read command sequence corresponding to the first read commands is given by the MMC 502. Therefore, referring back to FIG. 6, the buffer memory 510 is usually configured with a buffer area 612 (also known as a first buffer area 612) configured to temporarily store data and commands from the host system 11 or data from the RNVM module 406 and a buffer area 614 (also known as a second buffer area 614) configured to temporarily store the L-P table. Generally, a capacity of the first buffer area 612 is usually greater than a capacity of the second buffer area 614. That is to say, a number of the buffer units configured for the first buffer area 612 is greater than a number of the buffer units configured for the second buffer area 614. It should be noted that, the invention is not intended to limit the number of the buffer units configured for the first buffer area 612 and the number of the buffer units configured for the second buffer area 614. For example, in another exemplary embodiment, the number of the buffer units in the first buffer area 612 may be configured to be greater than two buffer units or less than two buffer units according to requirements in performance and design of the memory storage apparatus 10.

Particularly, when the host system 11 is executing the random read operation, the logical addresses corresponding to random read commands are separately recorded in the L-P table. Therefore, the MMC 502 needs to load multiple parts of the mapping information in the L-P table to the second buffer area 614 of the buffer memory 510. Moreover, because a capacity of the buffer memory 510 is limited, the MMC 502 needs to repeatedly load the parts of the mapping information to the second buffer area 614 of the buffer memory 510. That is to say, the parts of mapping information cannot be temporarily stored all at the same time since the capacity of the second buffer area configured to temporarily store the L-P table (e.g., the size of two buffer units) is limited. As such, the MMC 502 must first complete reading the data corresponding to the mapping information currently in the second buffer area 614 from the RNVM module 406 to the first buffer area 612 (i.e., the data upload operation) and transmitting said data from the first buffer area 612 to itself (i.e., the internal data transmission). Only then, the MMC 502 can proceed to load other parts of the mapping information to the second buffer area and give the next random read command in the command queue to the RNVM module 406. In other words, when the host system 11 is executing the random read operation and the RNVM module 406 is in the busy state, the MMC 502 shows a low efficiency for executing the read commands, resulting in an overall performance deterioration of the memory storage apparatus 10.

Accordingly, in the present exemplary embodiment, when the first read commands including a plurality of LUs (also known as first LUs) are received by the MMC 502 from the host system 11, the MMC 502 places the read commands to the command queue and determines whether the host system 11 is executing the random read operation according to the first read commands in the command queue. For example, the MMC 502 determines whether the first LUs included by the first read commands are continuous logical addresses. If the first LUs are not the continuous logical addresses, it indicates that the first read commands are the random read commands so the MMC 502 determines that the host system 11 is executing the random read operation; otherwise, if the first LUs are the continuous logical addresses, it indicates that the first read commands are continuous read commands so the MMC 502 determines that the host system 11 is executing a continuous read operation. Then, the MMC 502 executes a L-P table pre-loading operation according to a result of aforesaid determination. For example, if determining that the first LUs are not the continuous logical addresses, the MMC 502 executes a first L-P table pre-loading operation; otherwise, if determining that the first LUs are the continuous logical addresses, the MMC 502 executes a second L-P table pre-loading operation. It is worth mentioning that, the first L-P table pre-loading operation is different from the second L-P table pre-loading operation.

It should be noted that, in the present exemplary embodiment, the first read commands further include at least one second LU. Also, an executing sequence of the first read commands corresponding to the first LUs is a first executing sequence, and an executing sequence of the first read commands corresponding to the second LU is a second executing sequence. For instance, the second executing sequence of the first read commands corresponding to the at least one second LU is prior to the first executing sequence of the first read commands corresponding to the first LUs. More specifically, when the MMC 502 determines that the host system 11 is executing the random read operation (e.g., when determining that the first LUs are not the continuous logical addresses), the MMC 502 executes the first L-P table pre-loading operation in a period of reading data belonging to the at least one second LU from the PEUs to the first buffer area 612 (in a period corresponding to the busy state).

In the present exemplary embodiment, the first L-P table pre-loading operation executed by the MMC 502 refers to asynchronously pre-loading mapping information corresponding to the first LUs in the L-P table from the RNVM module 406 to the first buffer area 612 (i.e., the buffer area 612 configured to temporarily store data and commands from the host system 11 or data from the RNVM module 406) of the buffer memory 510 according to a first executing sequence of the first read commands, rather than loading the mapping information corresponding to the first LUs to the second buffer area 614 configured to temporarily store the L-P table. Particularly, by sequentially pre-loading multiple non-continuous mapping information generated from the random read operation executed by the host system 11 to the first buffer area with greater space while the RNVM module 406 is in the busy state, a waiting time originally required in the busy state may be fully utilized to effectively reduce the time for executing the read commands spent by the MMC 502.

After the first L-P table pre-loading operation is executed by the MMC 502, the MMC 502 sends the first read command sequence corresponding to the first read commands, and reads data belonging to the first LUs from the PEUs to the first buffer area 612 according to the mapping information of the first LUs in the first buffer area 612. Here, the MMC 502 replaces the mapping information of the first LUs in the first buffer area by the data belonging to the first LUs. For example, the MMC 502 temporarily stores the read data belonging to the first LUs to the buffer units originally and temporarily stored with the mapping information of the first LUs in the first buffer area. By doing so, a usage space of the buffer memory 510 may be effectively saved. In order to describe the mapping table loading method and the operations of the MMC 502 of the invention more clearly, one example is provided below with reference to FIG. 8 and FIG. 9A to FIG. 9E.

Figure 8:
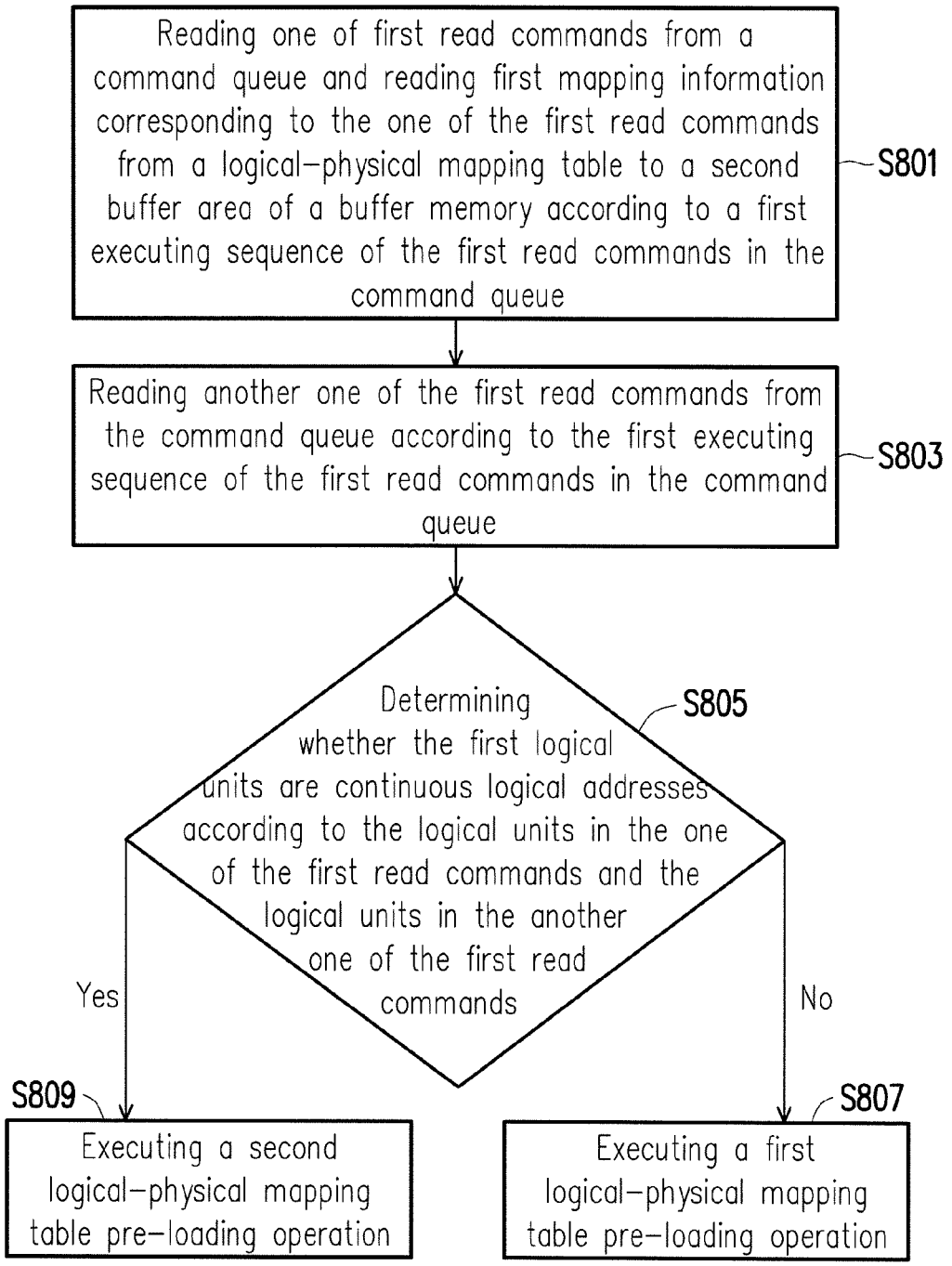
FIG. 8 illustrates a flowchart of determining whether the host system is executing the random read operation according to an exemplary embodiment of the invention.
Figure 9A:
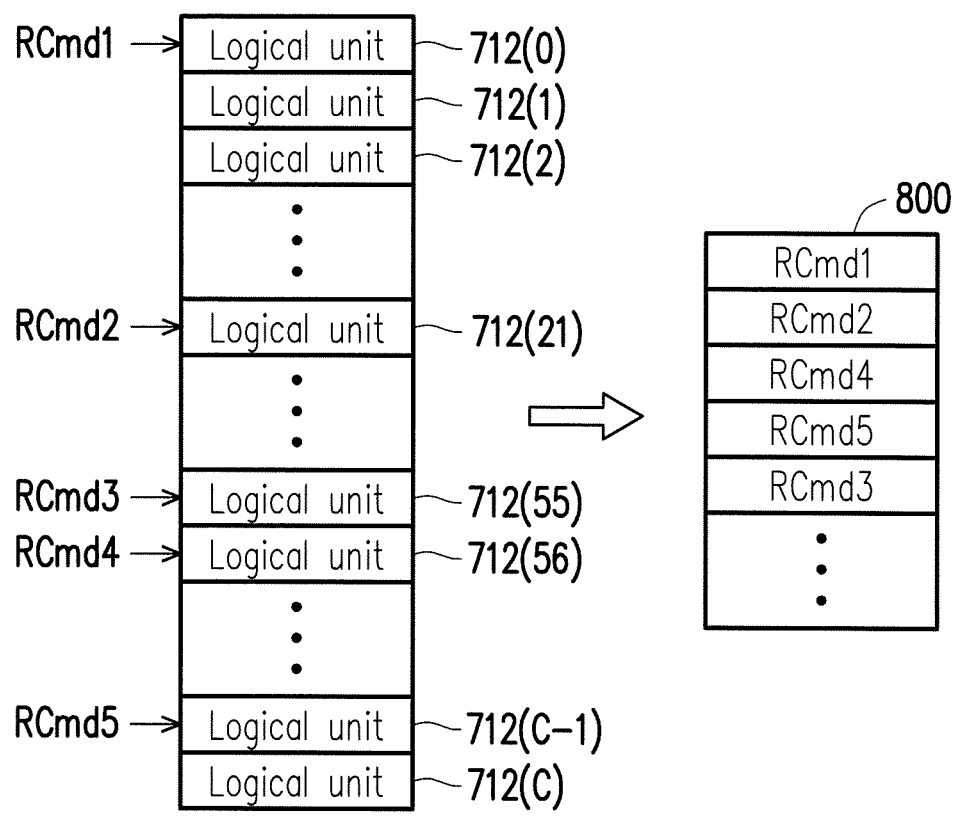
FIGS. 9A and 9B illustrate schematic diagrams of determining whether the host system is executing the random read operation according to an exemplary embodiment of the invention.
Figure 9B:
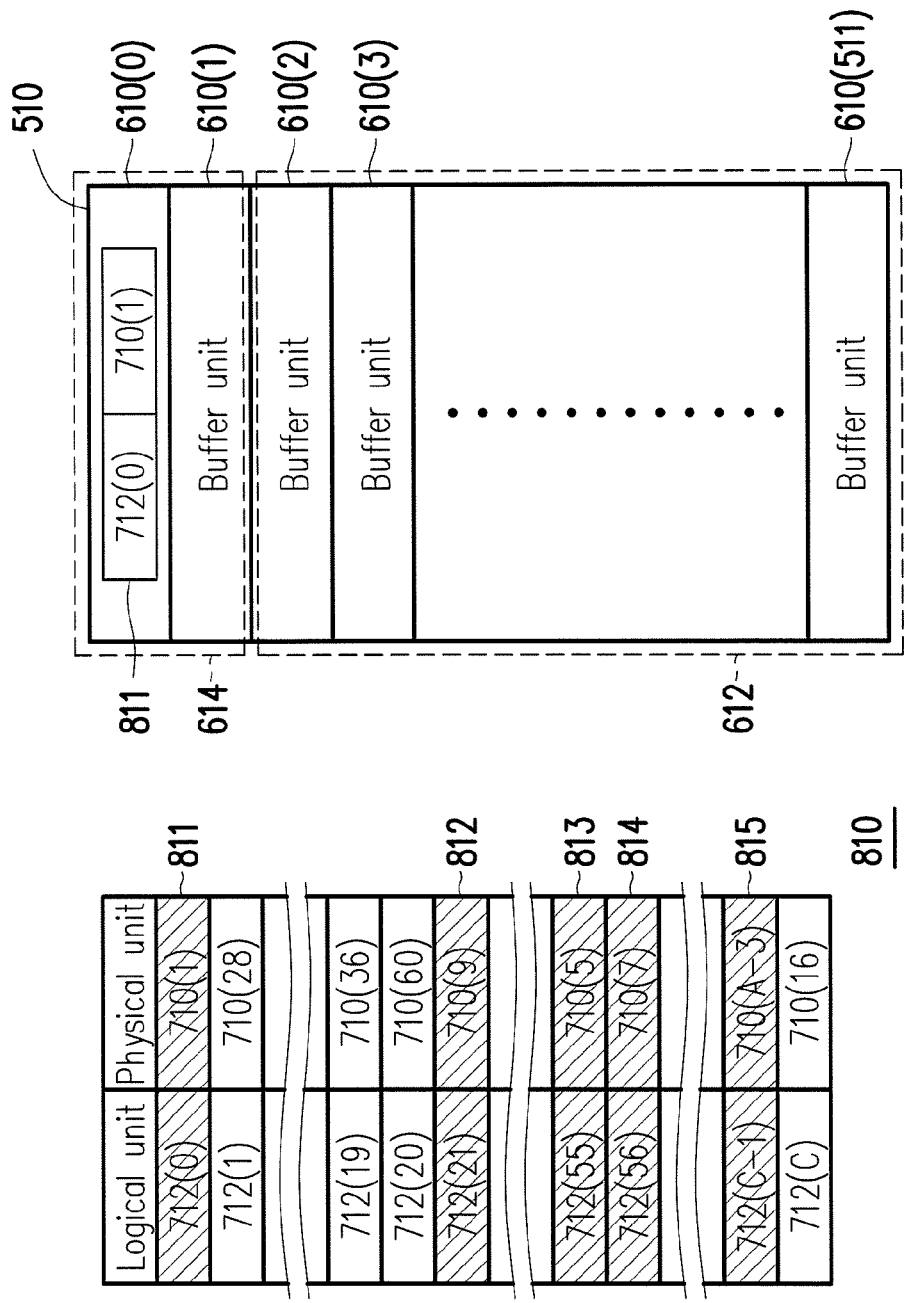

FIG. 8 illustrates a flowchart of determining whether the host system is executing the random read operation according to an exemplary embodiment of the invention. FIGS. 9A and 9B illustrate schematic diagrams of determining whether the host system is executing the random read operation according to an exemplary embodiment of the invention.

With reference to FIG. 9A, when a plurality of first read commands (i.e., first read commands RCmd1, RCmd2, RCmd3, RCmd4, RCmd5) including a plurality of first LUs (i.e., first read commands 712(0), 712(21), 712(55), 712(56), 712(C−1)) are received by the MMC 502 from the host system 11, the MMC 502 places the read commands to a command queue 800 and decides a sequence for the first read commands. For example, in the present exemplary embodiment, the first executing sequence of the first read commands decided by the MMC 502 are RCmd1, RCmd2, RCmd4, RCmd5, RCmd3 in that sequence. However, the invention is not intended to limit the first executing sequence of the first read commands. For example, in another exemplary embodiment, the first executing sequence of the first read commands decided by the MMC 502 is identical to a receiving sequence of the first read commands from the host system 11. In the present exemplary embodiment, the MMC 502 determines whether the host system 11 is executing the random read operation according to the first read commands in the command queue 800.

With reference to FIG. 8 and FIG. 9A to FIG. 9B, in step S801, the MMC 502 reads one of the first read commands from the command queue 800 and reads mapping information (also known as first mapping information) corresponding to the one of the first read commands from a L-P table 810 to the second buffer area 614 of the buffer memory 510 according to the first executing sequence of the first read commands RCmd1, RCmd2, RCmd4, RCmd5, RCmd3 in the command queue 800 (as shown in FIG. 9A). For example, the MMC 502 reads the first one among the first read commands (RCmd1) in the command queue 800 according to the first executing sequence, and reads first mapping information 811 corresponding to the first read command RCmd1 from the L-P table 810 to the buffer unit 610(0) in the second buffer area 614 of the buffer memory 510 (as shown in FIG. 9B).

Then, in step S803, the MMC 502 reads another one of the first read commands from the command queue 800 according to the first executing sequence of the first read commands in the command queue 800 (as shown in FIG. 9A). For example, the MMC 502 sequentially reads the second one among the first read commands (RCmd2) from the command queue 800.

In step S805, the MMC 502 determines whether the first LUs are continuous logical addresses according to the LU in the one of the first read commands (i.e., the first read command RCmd1) and the LU in the another one of the first read commands (i.e., the first read command RCmd2). Specifically, the MMC 502 identifies that the LU 712(0) of the first read command RCmd1 and the LU 712(21) of the first read command RCmd2 are two non-continuous logical addresses, and thus determines that the first read commands are not the continuous logical addresses. That is to say, the MMC 502 determines that the host system 11 is executing the random read operation. Therefore, the MMC 502 executes the first L-P table pre-loading operation (as shown in step S807). Otherwise, in another exemplary embodiment, if the LU of the first read command RCmd1 and the LU of the first read command RCmd2 are the continuous logical addresses, the MMC 502 executes the second L-P table pre-loading operation (as shown in step S809). The first L-P table pre-loading operation executed after the MMC 502 determines that the host system 11 is executing the random read operation is described below with reference to FIG. 9C to FIG. 9E.

Figure 9C:
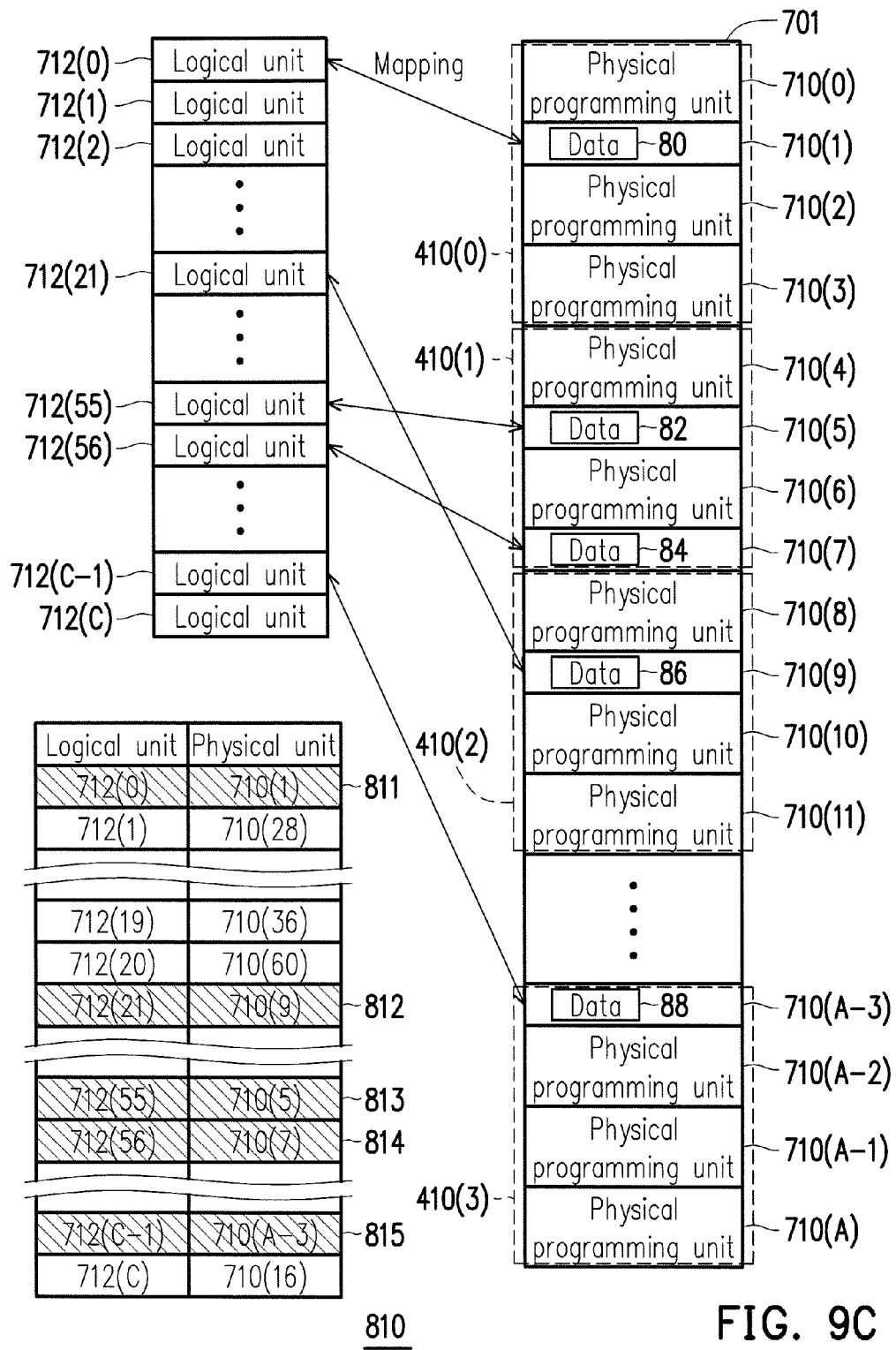
FIG. 9C is a schematic diagram illustrating a logical-physical mapping table and a mapping relation between the logical units and the physical programming units therein according to an exemplary embodiment of the invention.
Figure 9D:
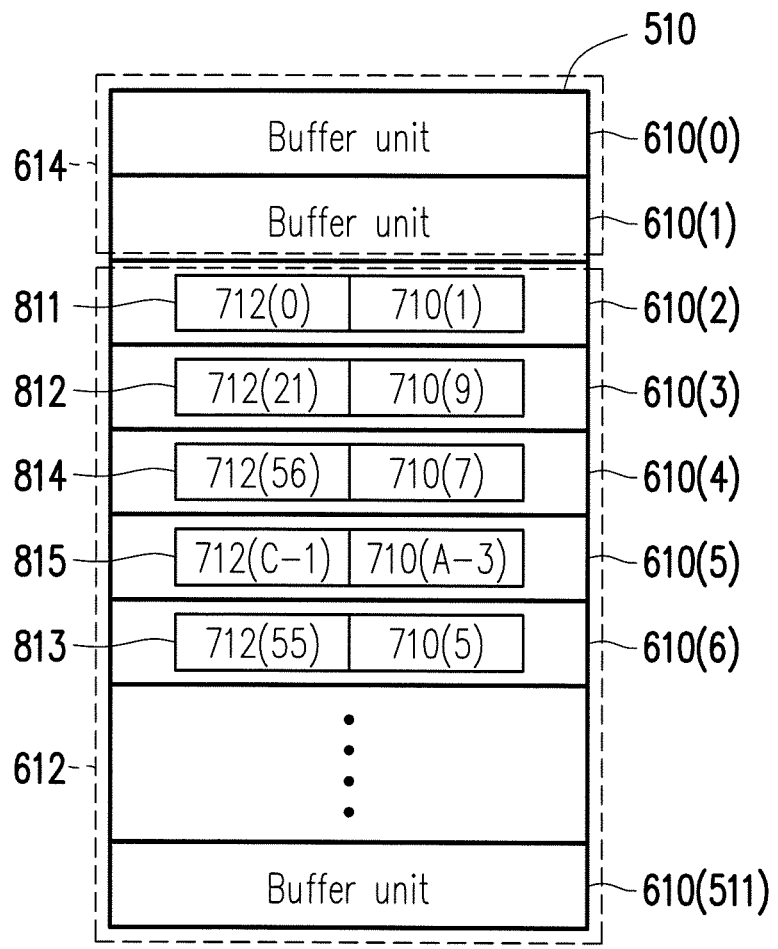
FIG. 9D illustrates a schematic diagram of performing a first logical-physical mapping table pre-loading operation according to an exemplary embodiment of the invention.

FIG. 9C is a schematic diagram illustrating a L-P table and a mapping relation between the logical units and the physical programming units therein according to an exemplary embodiment of the invention. FIG. 9D illustrates a schematic diagram of performing a first L-P table pre-loading operation according to an exemplary embodiment of the invention.

For descriptive convenience, FIG. 9 is illustrated using an example in which one physical erasing unit includes four physical programming units. However, person with ordinary skill in the art should be able to understand that one PEU can include not only four PPUs but any other numbers of PPUs, and details regarding the same are omitted hereinafter. With reference to FIG. 9C and FIG. 9D, according to the mapping information 811, 812, 813, 814 and 815, the MMC 502 can learn that, the first LU 712(0) is mapped to the PPU 710(1), the first LU 712(21) is mapped to the PPU 710(9), the first LU 712(56) is mapped to the PPU 710(7), the first LU 712(C-1) is mapped to the PPU 710(A-3), and the first LU 712(55) is mapped to the PPU 710(5) (as shown in FIG. 9C). In the exemplary embodiments of the invention, when MMC 502 determines that the host system 11 is executing the random read operation, the MMC 502 temporarily stores the mapping information (i.e., the mapping information 811, 812, 814, 815, 813) corresponding to each of the first LUs 712(0), 712(21), 712(56), 712(C-1) and 712(55) in the L-P table 810 respectively in sequence to the buffer units 610(2) to 610(6) belonging to the first buffer area 612 according to the first executing sequence of the first read commands in the command queue 800 (as shown in FIG. 9D). In the present exemplary embodiment, it is assumed that the capacity of one PPU can be used to store data of 4 KB and a capacity of one buffer unit is 4 KB. In other words, a data capacity mapped by the mapping information recorded by one buffer unit is 4 KB.

It should be noted that, the present exemplary embodiment is described taking an example in which the MMC 502 receives the five first read commands (RCmd1, RCmd2, RCmd3, RCmd4, RCmd5) in sequence from the host system 11. Also, when the MMC 502 is executing the first L-P table pre-loading operation, the MMC 502 loads all the mapping information corresponding to the five read commands to the first buffer area 612 while the RNVM module 406 is in the busy state. However, the invention is not limited thereto. For example, in another exemplary embodiment, the number of the first read commands received in sequence from the host system 11 by the MMC 502 may also be greater than or less than five. For instance, if the MMC 502 receives ten first read commands in sequence from the host system 11 in another exemplary embodiment, when the MMC 502 is executing the first L-P table pre-loading operation, the MMC 502 can decide whether to asynchronously load mapping information corresponding to the ten read commands to the first buffer area 612 at the same time according to a busy time corresponding to the busy state of the RNVM module 406. For example, the MMC 502 can load all the mapping information corresponding to the ten read commands to the first buffer area 612 during the busy time, or only load the mapping information corresponding to five of the read commands to the first buffer area 612 during the busy time.

Then, when the RNVM module 406 is not in the busy state—for example, when the data upload operation and the internal data transmission corresponding to the at least one second LU are completed by the MMC 502—the MMC 502 can read data from the PPU 710(1), the PPU 710(9), the PPU 710(7), the PPU 710(A-3) and the PPU 710(5) in sequence to the first buffer area 612 according to the mapping information 811, 812, 814, 815 and 813 of the first LUs in the first buffer area 612.

Figure 9E:
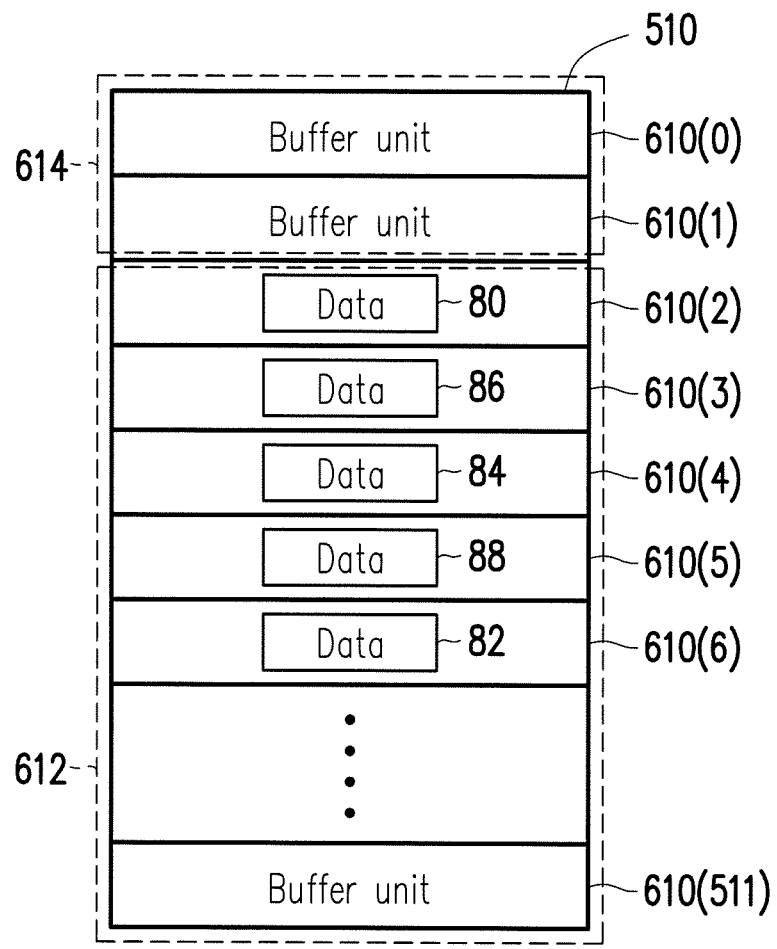
FIG. 9E illustrates a schematic diagram of replacing the mapping information of first logical units in a first buffer area by data belonging to the first logical units according to an exemplary embodiment of the invention.

FIG. 9E illustrates a schematic diagram of replacing the mapping information of first logical units in a first buffer area by data belonging to the first logical units according to an exemplary embodiment of the invention.

Referring to FIG. 9C to FIG. 9E together, in the present exemplary embodiment, the MMC 502 temporarily stores data belonging to the first LUs and having the data capacity of 4 KB to the buffer units recorded with the mapping information of the first LUs. For instance, the MMC 502 can read data 80 from the PPU 710(1) and temporarily store the data 80 to the buffer unit 610(2) recorded with the mapping information 811 according to the mapping information 811 in the buffer unit 610(2) in the first buffer area 612. That is, the mapping information 811 in the buffer unit 610(2) is replaced by the data 80. Further, by analogy, the MMC 502 can sequentially replace the mapping information 812 in the buffer unit 610(3), the mapping information 814 in the buffer unit 610(4), the mapping information 815 in the buffer unit 610(5) and the mapping information 813 in the buffer unit 610(6) by data 86 read from the PPU 710(9), data 84 read from the PPU 710(7), data 88 read from the PPU 710(A-3) and data 82 read from the PPU 710(5), respectively. Then, the MMC 502 transmits the data 80, 86, 84, 88 and 82 so these data may then be received from the first buffer area 612, and transmits received data 80, 86, 84, 88 and 82 to the host system 11 via the data transmission interface 114.

It should be noted that, in the example where the capacity of one buffer unit is 4 KB, it is assumed that the capacity of one PPU can be used to store data of 4 KB in the invention. Therefore, in the first L-P table pre-loading operation, one buffer unit is configured to record the data with the capacity of 4 KB. That is, one buffer unit merely records one mapping information of one PPU and the LU thereof. However, the invention is not intended to limit the data capacity stored by the PPU. For example, in another exemplary embodiment, if the data capacity stored by one PPU is less than 4 KB, one buffer unit can record mapping information of multiple PPUs and the LUs thereof, and a total of the data capacities of the PPUs corresponding to the mapping information belonging to said one buffer unit is 4 KB.

On the other hand, if the MMC 502 determines that the host system 11 is executing the continuous read operation (i.e., when determining that the first LUs are the continuous logical addresses), the MMC 502 executes the second L-P table pre-loading operation. Here, because the continuous logical addresses are recorded in the L-P table in form of continuous mapping information, the MMC 502 does not need to repeatedly load the mapping information in the L-P table. Therefore, the MMC 502 can pre-load the mapping information of the first LUs from the RNVM module 406 to the second buffer area 614 of the buffer memory 510 all at once. For example, in the situation of FIG. 9B, if the MMC 502 determines that the LU of the first read command RCmd1 and the LU of the first read command RCmd2 are the continuous logical addresses, the MMC 502 reads all the mapping information of the first LUs corresponding to the first read commands corresponding to the command queue 800 to the buffer unit 610(0) in the second buffer area 614 all at once. Next, the MMC 502 reads data belonging to the first LUs from the PEUs to the first buffer area 612 according to the mapping information of the first LUs recorded in the second buffer area 614.

Figure 10:
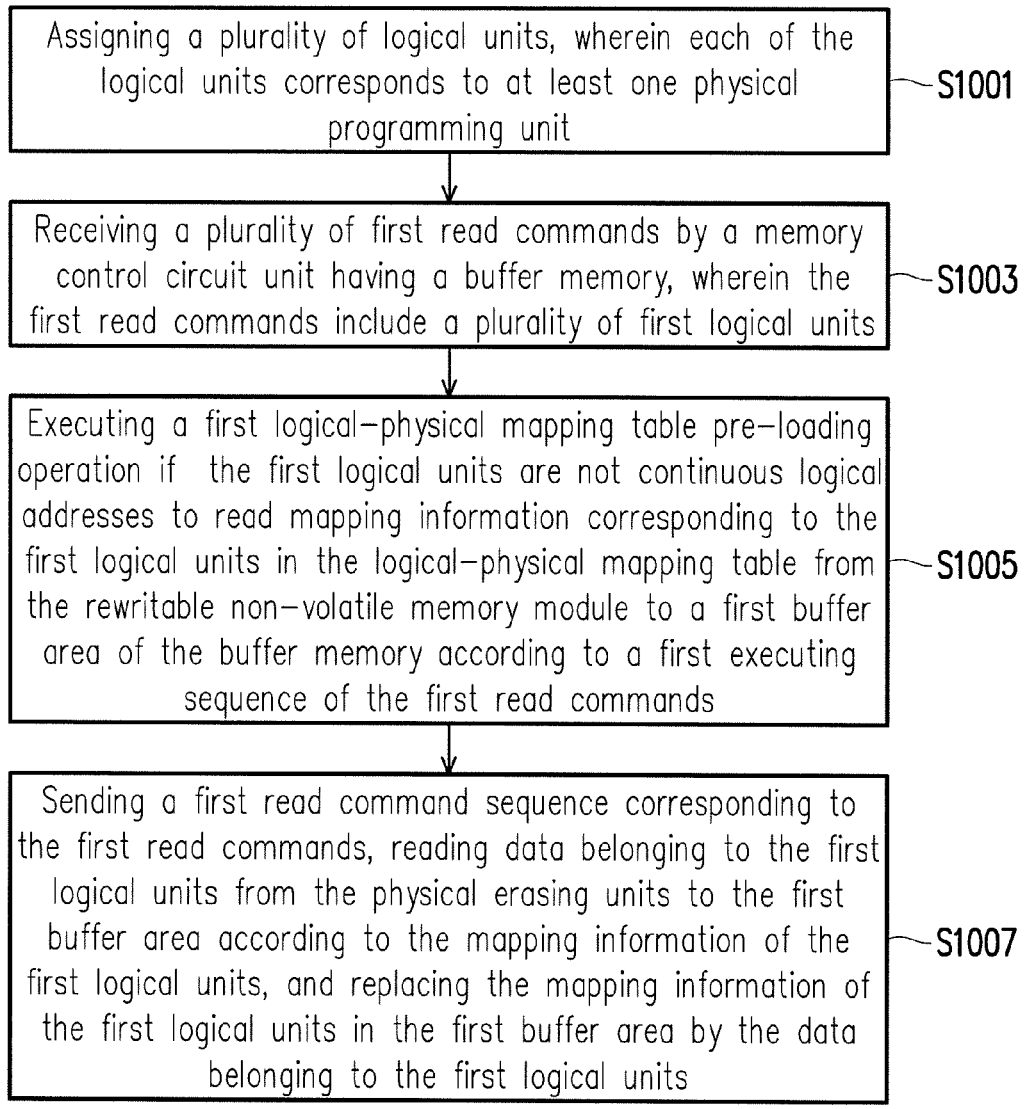
FIG. 10 is a flowchart illustrating a mapping table loading method according to an exemplary embodiment of the invention.

FIG. 10 is a flowchart illustrating a mapping table loading method according to an exemplary embodiment of the invention.

With reference to FIG. 10, in step S1001, the MMC 502 assigns a plurality of LUs, where each of the LUs corresponds to at least one PPU.

In step S1003, the MMC 502 receives a plurality of first read commands, where the first read commands include a plurality of first LUs.

In step S1005, the MMC 502 executes a first L-P table pre-loading operation to read mapping information corresponding to the first LUs in a L-P table from a RNVM module to a first buffer area of a buffer memory according to a first executing sequence of the first read commands if the first LUs are not continuous logical addresses.

In step S1007, the MMC 502 sends a first read command sequence corresponding to the first read commands, reads data belonging to the first LUs from the PEUs to the first buffer area according to the mapping information of the first LUs, and replaces the mapping information of the first LUs in the first buffer area by the data belonging to the first LUs.

Nevertheless, steps depicted in FIG. 10 are described in detail as above so that related description thereof is omitted hereinafter. It should be noted that, the steps depicted in FIG. 10 may be implemented as a plurality of program codes or circuits, which are not particularly limited in the invention. Moreover, the method disclosed in FIG. 10 may be implemented by reference with above exemplary embodiments, or may be implemented separately, which are not particularly limited in the invention.

In summary, according to the mapping table loading method, the memory storage apparatus and the MCCU proposed in the exemplary embodiments of the invention, multiple non-continuous mapping information generated from the random read operation executed by the host system may be sequentially pre-loaded to the first buffer area with greater space (i.e., the buffer area configured to temporarily store data and commands from the host system or data from the RNVM module) while the RNVM module is in the busy state. In this way, the waiting time originally required in the busy state may be fully utilized to effectively reduce the time for executing the read commands. On the other hand, according to the invention, data read from the RNVM module are used to replace the mapping information pertaining to those data in the first buffer area. Accordingly, when the RNVM module is in the busy state and the host system is executing the random read operation, the read mapping information is no longer limited by the capacity of the second buffer area configured to temporarily store the L-P table and the configured space of the buffer memory may be effectively saved. As a result, speed and performance of the memory storage apparatus when reading data may also be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mapping table loading method for a rewritable non-volatile memory module, the rewritable non-volatile memory module having a plurality of physical erasing units, each of the physical erasing units having a plurality of physical programming units, wherein a logical-physical mapping table is stored in the rewritable non-volatile memory module, and the mapping table loading method comprises:

assigning a plurality of logical units, wherein each of the logical units corresponds to at least one physical programming unit;

receiving a plurality of first read commands by a memory control circuit unit having a buffer memory, wherein the first read commands comprise a plurality of first logical units;

executing a first logical-physical mapping table pre-loading operation if the first logical units are not continuous logical addresses, wherein the first logical-physical mapping table pre-loading operation comprises reading mapping information corresponding to the first logical units in the logical-physical mapping table from the rewritable non-volatile memory module to a first buffer area of the buffer memory according to a first executing sequence of the first read commands; and sending a first read command sequence corresponding to the first read commands, reading data belonging to the first logical units from the physical erasing units to the first buffer area according to the mapping information of the first logical units, and replacing the mapping information of the first logical units in the first buffer area by the data belonging to the first logical units.

2. The mapping table loading method according to claim 1, wherein the first read commands further comprise at least one second logical unit, and the mapping table loading method further comprises:

executing the first logical-physical mapping table pre-loading operation in a period of reading data belonging to the at least one second logical unit from the physical erasing units to the first buffer area, wherein a second executing sequence of the first read commands corresponding to the at least one second logical unit is prior to the first executing sequence of the first read commands corresponding to the first logical units.

3. The mapping table loading method of claim 1, further comprising:

executing a second logical-physical mapping table pre-loading operation if the first logical units are the continuous logical addresses, wherein the second logical-physical mapping table pre-loading operation comprises reading the mapping information corresponding to the first logical units in the logical-physical mapping table from the rewritable non-volatile memory module to a second buffer area of the buffer memory, wherein the second buffer area is different from the first buffer area; and sending the first read command sequence corresponding to the first read commands, and reading the data belonging to the first logical units from the physical erasing units to the first buffer area according to the mapping information of the first logical units.

4. The mapping table loading method according to claim 3, wherein the step of receiving the first read commands by the memory control circuit unit having the buffer memory further comprises:

placing the first read commands in a command queue;

reading one of the first read commands from the command queue and reading first mapping information corresponding to the one of the first read commands from the logical-physical mapping table to the second buffer area of the buffer memory according to the first executing sequence of the first read commands in the command queue;

reading another one of the first read commands from the command queue according to the first executing sequence of the first read commands in the command queue; and determining whether the first logical units are the continuous logical addresses according to the logical unit in the one of the first read commands and the logical unit in the another one of the first read commands, wherein an executing sequence of the one of the first read commands is prior to an executing sequence of the another one of the first read commands.

5. The mapping table loading method according to claim 1, wherein the buffer memory has a plurality of buffer units and a capacity of one buffer unit is a first unit capacity, wherein a number of the buffer units included by the first buffer area is greater than a number of the buffer units included by the second buffer area, and the step of executing the first logical-physical mapping table pre-loading operation further comprises:

temporarily storing the mapping information for each of the first logical units in the logical-physical mapping table in sequence to the buffer units belonging to the first buffer area, wherein a data capacity mapped by the mapping information recorded by the buffer units is the first unit capacity.

6. The mapping table loading method according to claim 5, wherein the step of replacing the mapping information of the first logical units in the first buffer area by the data belonging to the first logical units comprises:

temporarily storing data belonging to the first logical units and having the data capacity of the first unit capacity to the buffer units recorded with the mapping information of the first logical units, wherein the first unit capacity is less than a capacity of one physical erasing unit.

7. A mapping table loading method for a rewritable non-volatile memory module, the rewritable non-volatile memory module having a plurality of physical erasing units, each of the physical erasing units having a plurality of physical programming units, wherein a logical-physical mapping table is stored in the rewritable non-volatile memory module, and the mapping table loading method comprises:

assigning a plurality of logical units, wherein each of the logical units corresponds to at least one physical programming unit;

receiving a plurality of first read commands by a memory control circuit unit having a buffer memory, wherein the first read commands comprise a plurality of first logical units;

according to a first executing sequence of the first read commands in a command queue, reading one of the first read commands from the command queue and reading first mapping information corresponding to the one of the first read commands from the logical-physical mapping table to a second buffer area of the buffer memory;

reading another one of the first read commands from the command queue according to the first executing sequence of the first read commands in the command queue;

determining whether the first logical units are continuous logical addresses according to the logical unit in the one of the first read commands and the logical unit in the another one of the first read commands; and executing a first logical-physical mapping table pre-loading operation if determining that the first logical units are not the continuous logical addresses, wherein the first logical-physical mapping table pre-loading operation comprises reading mapping information corresponding to the first logical units in the logical-physical mapping table from the rewritable non-volatile memory module to a first buffer area of the buffer memory according to the first executing sequence of the first read commands, wherein the second buffer area is different from the first buffer area.

8. The mapping table loading method according to claim 7, wherein the step of receiving the first read commands by the memory control circuit unit having the buffer memory further comprises:

storing the first read commands in the command queue, wherein an executing sequence of the one of the first read commands is prior to an executing sequence of the another one of the first read commands.

9. The mapping table loading method according to claim 7, wherein a step after executing the first logical-physical mapping table pre-loading operation comprises:

sending a first read command sequence corresponding to the first read commands, reading data belonging to the first logical units from the physical erasing units to the first buffer area according to the mapping information of the first logical units, and replacing the mapping information of the first logical units in the first buffer area by the data belonging to the first logical units.

10. The mapping table loading method according to claim 7, wherein the first read commands further comprise at least one second logical unit, and the mapping table loading method further comprises:

executing the first logical-physical mapping table pre-loading operation in a period of reading data belonging to the at least one second logical unit from the physical erasing units to the first buffer area, wherein a second executing sequence of the first read commands corresponding to the at least one second logical unit is prior to the first executing sequence of the first read commands corresponding to the first logical units.

11. The mapping table loading method of claim 7, further comprising:

executing a second logical-physical mapping table pre-loading operation if the first logical units are the continuous logical addresses, wherein the second logical-physical mapping table pre-loading operation comprises reading the mapping information corresponding to the first logical units in the logical-physical mapping table from the rewritable non-volatile memory module to the second buffer area of the buffer memory; and sending the first read command sequence corresponding to the first read commands, and reading the data belonging to the first logical units from the physical erasing units to the first buffer area according to the mapping information of the first logical units.

12. A memory storage apparatus, comprising:

a connection interface unit, configured to couple to a host system;

a rewritable non-volatile memory module; and a memory control circuit unit, coupled to the connection interface unit and the rewritable non-volatile memory module, wherein the memory control circuit unit comprises a buffer memory, and is configured to assign a plurality of logical units, wherein each of the logical units corresponds to at least one physical programming unit, wherein the memory control circuit unit is further configured to receive a plurality of first read commands from the host system, wherein the first read commands comprise a plurality of first logical units, wherein the memory control circuit unit is further configured to execute a first logical-physical mapping table pre-loading operation if the first logical units are not continuous logical addresses, wherein the first logical-physical mapping table pre-loading operation comprises reading mapping information corresponding to the first logical units in the logical-physical mapping table from the rewritable non-volatile memory module to a first buffer area of the buffer memory according to a first executing sequence of the first read commands, wherein the memory control circuit unit is further configured to send a first read command sequence corresponding to the first read commands, read data belonging to the first logical units from the physical erasing units to the first buffer area according to the mapping information of the first logical units, and replace the mapping information of the first logical units in the first buffer area by the data belonging to the first logical units.

13. The memory storage apparatus according to claim 12, wherein the first read commands further comprise at least one second logical unit, wherein the memory control circuit unit is further configured to execute the first logical-physical mapping table pre-loading operation in a period of reading data belonging to the at least one second logical unit from the physical erasing units to the first buffer area, wherein a second executing sequence of the first read commands corresponding to the at least one second logical unit is prior to the first executing sequence of the first read commands corresponding to the first logical units.

14. The memory storage apparatus according to claim 12, wherein the memory control circuit unit is further configured to execute a second logical-physical mapping table pre-loading operation if the first logical units are the continuous logical addresses, wherein the second logical-physical mapping table pre-loading operation comprises reading the mapping information corresponding to the first logical units in the logical-physical mapping table from the rewritable non-volatile memory module to a second buffer area of the buffer memory, wherein the second buffer area is different from the first buffer area, wherein the memory control circuit unit is further configured to send the first read command sequence corresponding to the first read commands, and read the data belonging to the first logical units from the physical erasing units to the first buffer area according to the mapping information of the first logical units.

15. The memory storage apparatus according to claim 14, wherein in the operation of receiving the first read commands;

the memory control circuit unit is further configured to place the first read commands in a command queue, read one of the first read commands from the command queue and read first mapping information corresponding to the one of the first read commands from the logical-physical mapping table to the second buffer area of the buffer memory according to the first executing sequence of the first read commands in the command queue;

the memory control circuit unit is further configured to read another one of the first read commands from the command queue according to the first executing sequence of the first read commands in the command queue; and the memory control circuit unit is further configured to determine whether the first logical units are the continuous logical addresses according to the logical unit in the one of the first read commands and the logical unit in the another one of the first read commands, wherein an executing sequence of the one of the first read commands is prior to an executing sequence of the another one of the first read commands.

16. The memory storage apparatus according to claim 12, wherein the buffer memory has a plurality of buffer units and a capacity of one buffer unit is a first unit capacity, wherein a number of the buffer units included by the first buffer area is greater than a number of the buffer units included by the second buffer area, wherein in the first logical-physical mapping table pre-loading operation, the memory control circuit unit is further configured to temporarily store the mapping information for each of the first logical units in the logical-physical mapping table in sequence to the buffer units belonging to the first buffer area, wherein a data capacity mapped by the mapping information recorded by the buffer units is the first unit capacity.

17. The memory storage apparatus according to claim 16, wherein in the operation of replacing the mapping information of the first logical units in the first buffer area by the data belonging to the first logical units, the memory control circuit unit is further configured to temporarily store data belonging to the first logical units and having the data capacity of the first unit capacity to the buffer units recorded with the mapping information of the first logical units, wherein the first unit capacity is less than a capacity of one physical erasing unit.

18. A memory storage apparatus, comprising:

a connection interface unit, configured to couple to a host system;

a rewritable non-volatile memory module; and a memory control circuit unit, coupled to the connection interface unit and the rewritable non-volatile memory module, wherein the memory control circuit unit comprises a buffer memory, and is configured to assign a plurality of logical units, wherein each of the logical units corresponds to at least one physical programming unit, wherein the memory control circuit unit is further configured to receive a plurality of first read commands from the host system, wherein the first read commands comprise a plurality of first logical units, wherein the memory control circuit unit is further configured to, according to a first executing sequence of the first read commands in a command queue, read one of the first read commands from the command queue and read first mapping information corresponding to the one of the first read commands from the logical-physical mapping table to a second buffer area of the buffer memory, wherein the memory control circuit unit is further configured to read another one of the first read commands from the command queue according to the first executing sequence of the first read commands in the command queue, wherein the memory control circuit unit is further configured to determine whether the first logical units are continuous logical addresses according to the logical unit in the one of the first read commands and the logical unit in the another one of the first read commands, wherein the memory control circuit unit is further configured to execute a first logical-physical mapping table pre-loading operation if determining that the first logical units are not the continuous logical addresses, wherein the first logical-physical mapping table pre-loading operation comprises reading mapping information corresponding to the first logical units in the logical-physical mapping table from the rewritable non-volatile memory module to a first buffer area of the buffer memory according to the first executing sequence of the first read commands, wherein the second buffer area is different from the first buffer area.

19. The memory storage apparatus according to claim 18, wherein in the operation of receiving the first read commands by the memory control circuit unit having the buffer memory, the memory control circuit unit is further configured to store the first read commands in the command queue, wherein an executing sequence of the one of the first read commands is prior to an executing sequence of the another one of the first read commands.

20. The memory storage apparatus according to claim 18, wherein after executing the first logical-physical mapping table pre-loading operation, the memory control circuit unit is further configured to send a first read command sequence corresponding to the first read commands, read data belonging to the first logical units from the physical erasing units to the first buffer area according to the mapping information of the first logical units, and replace the mapping information of the first logical units in the first buffer area by the data belonging to the first logical units.

21. The memory storage apparatus according to claim 18, wherein the first read commands further comprise at least one second logical unit, wherein the memory control circuit unit is further configured to execute the first logical-physical mapping table pre-loading operation in a period of reading data belonging to the at least one second logical unit from the physical erasing units to the first buffer area, wherein a second executing sequence of the first read commands corresponding to the at least one second logical unit is prior to the first executing sequence of the first read commands corresponding to the first logical units.

22. The memory storage apparatus according to claim 18, wherein the memory control circuit unit is further configured to execute a second logical-physical mapping table pre-loading operation if the first logical units are the continuous logical addresses, wherein the second logical-physical mapping table pre-loading operation comprises reading the mapping information corresponding to the first logical units in the logical-physical mapping table from the rewritable non-volatile memory module to the second buffer area of the buffer memory, wherein the memory control circuit unit is further configured to send the first read command sequence corresponding to the first read commands, and read the data belonging to the first logical units from the physical erasing units to the first buffer area according to the mapping information of the first logical units.

* * * * *